March 25, 1969  R. A. CRESSWELL  3,434,290
NOZZLE ASSEMBLY
Filed Aug. 10, 1967
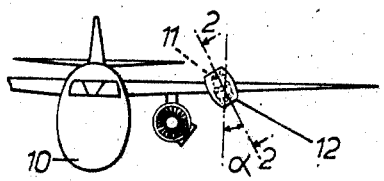
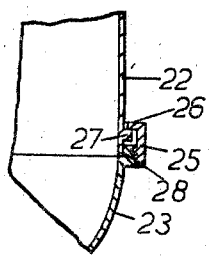
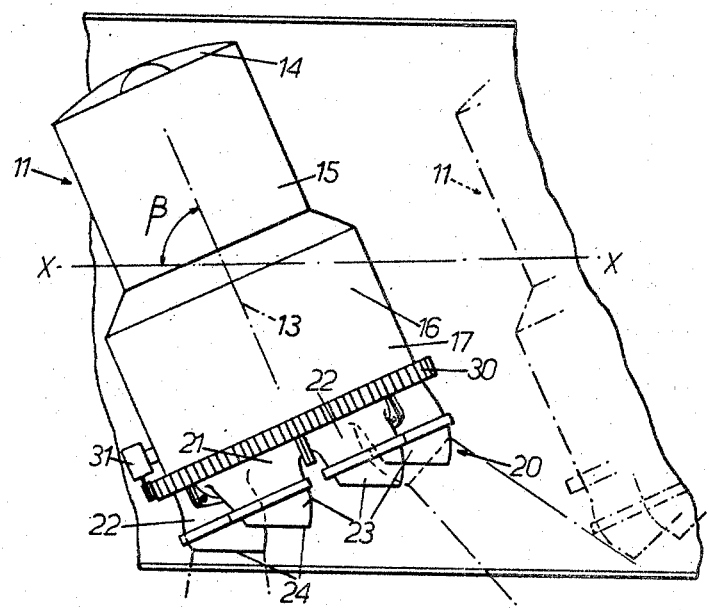
Inventor
Roger Cresswell
By Cushman, Darby & Cushman
Attorneys

United States Patent Office 3,434,290
Patented Mar. 25, 1969

3,434,290
NOZZLE ASSEMBLY
Roger A. Cresswell, Derby, England, assignor to Rolls-Royce Limited, Derby, England, a British company
Filed Aug. 10, 1967, Ser. No. 659,721
Claims priority, application Great Britain, Aug. 24, 1966, 38,038/66
Int. Cl. F02k *1/24;* B64c *15/00*
U.S. Cl. 60—232                                                   9 Claims

ABSTRACT OF THE DISCLOSURE

A nozzle assembly, particularly for a lift jet engine, has multiple tubular outlets from a common annular chamber, each outlet having detachably mounted thereon a curved exit portion so that gases are discharged from the assembly in a common direction inclined to the axis of symmetry thereof.

---

This invention relates to nozzle assemblies, and is particularly applicable to jet exhaust nozzles for use with direct lift gas turbine jet engines, that is, engines which generate lift directly on an aircraft independently of aerodynamic lift.

According to the invention, in one aspect, there is provided a nozzle assembly comprising a plurality of tubular nozzle members extending parallel to and symmetrically disposed about a common axis and an annular chamber communicating with the upstream end of each nozzle member, each nozzle member having a respective curved exit portion which is detachably secured to the downstream end of the nozzle member and which is adapted to discharge gases passing therethrough in a common direction inclined to said common axis.

Preferably the junction between each nozzle member and its respective exit portion is disposed in a plane perpendicular to said common axis.

Each exit portion may be provided with an external screw thread at its upstream end by means of which it is attached to the respective nozzle.

The invention also provides a gas turbine jet engine provided immediately downstream of its turbine with a nozzle assembly as set forth above.

In a preferred embodiment, the nozzle assembly is mounted on the engine for rotation about the said common axis.

In a further aspect, the invention provides an aircraft having installed therein, for the purpose of generating direct lift forces thereon independently of aerodynamic lift, a gas turbine jet engine provided with a nozzle assembly as set forth above.

In a preferred arrangement, a plurality of engines are disposed side by side with their axes parallel within a pod or housing. The axis of each engine may lie in a plane of symmetry of the pod or housing, said plane being inclined to the pitching plane of the aircraft. Alternatively, or in addition, each engine may be mounted within the pod or housing with its axis inclined to the longitudinal axis of the pod or housing, so that the intake end of each engine is disposed forwardly of its exhaust end.

The exit portion of the nozzle assembly provided on each engine preferably terminates at its downstream end in a discharge outlet which is disposed in a plane inclined to the said common axis.

As an improvement in or modification of the invention described in the complete specification of the applicant's U.S. patent application Ser. No. 488,209, filed Sept. 17, 1965, the present invention also provides an aircraft having mounted therein at least one turbo-jet direct lift engine which has a rotatable jet deflector nozzle assembly comprising a plurality of tubular nozzle members disposed symmetrically about the longitudinal axis of the engine, the or each said engine being mounted in a fixed position so that the longitudinal axis thereof has a substantial inclination with respect to the yaw axis of the aircraft so that the resultant direction of jet thrust of the or each engine may be varied by rotation of the nozzle assembly about the longitudinal axis of the engine so as to be alternatively substantially parallel to the yaw axis of the aircraft, or to have a rearward, forward or lateral component with respect to the aircraft as required.

The invention will be descibed, merely by way of example, with reference to the accompanying drawings, in which:

FIGURE 1 is a front elevation of an aircraft provided with lift gas turbine engines in accordance with the invention;

FIGURE 2 is a diagrammatic partial section through a lift engine pod of the aircraft shown in FIGURE 1, taken on the line 2—2 of FIGURE 1, and FIGURE 3 is a scrap section of part of a nozzle assembly according to the invention.

Referring to FIGURE 1, there is shown an aircraft 10 having, in addition to forward propulsion engines a plurality of direct lift engines 11 for producing lift on the aircraft directly and independently of aerodynamic lift. The lift engines 11 have a thrust-to-weight ratio greater than 12:1. The lift engines 11 are mounted in two wing pods 12, one only of which is shown in FIGURE 1, a number of engines 11 being mounted side by side in each pod 12, as shown in FIGURE 2.

A longitudinal plane of symmetry of each pod 12, which is indicated by the section line 2—2 in FIGURE 1, is inclined to the direction of the yaw axis of the aircraft (i.e., the vertical direction, as shown in FIGURE 1) at an angle $\alpha$, in this case about 25°, the upper end of the pod 12 being disposed inboard of the lower end thereof. In addition, each engine 11 is mounted within its pod 12 with the longitudinal axis 13 of the engine 11 inclined to the longitudinal axis X—X of the pod 12 at an angle $\beta$ (FIGURE 2), in this case approximately 76½°, the upper end of each engine 11 being disposed forwardly of the lower end thereof.

Each lift engine 11 comprises an air intake 14, disposed uppermost, a compressor 15, combustion equipment 16 and a turbine 17. Some of the components of the engine 11, for example the compressor 15, may be formed from synthetic resin material.

Each engine 11 is provided with a nozzle assembly 20 downstream of the turbine 17. Referring to FIGURE 2, each nozzle assembly 20 comprises an annular collecting chamber 21 which is disposed immediately downstream of the turbine 17 and receives the exhaust gases therefrom, and a plurality of tubular nozzle members 22, each of which extends parallel to and is symmetrically disposed about the longitudinal axis 13 of the engine, and communicates at its upstream end with the chamber 21. As will be seen from FIGURE 2, the axial extent of the annular collecting chamber 21 is kept to a minimum and is just sufficient to enable the chamber 21 to collect the turbine exhaust gases and divide them into the nozzle members 22. In the illustrated embodiment, the nozzle assembly 20 has six symmetrically disposed nozzle members 22.

A curved exit portion 23 is detachably secured to the downstream end of each respective tubular nozzle member 22. Each exit portion 23 terminates in a discharge outlet 24, all the discharge outlets 24 of the nozzle assembly 20 being disposed in parallel planes. The nozzle assembly may be so disposed, e.g., when the engines are not in use, that the said parallel planes make an angle with the longitudinal axis 13 of the engine 11 substantially equal to the angle β between the engine's longitudinal axis 13 and the longitudinal axis X—X of the pod 12.

Referring to FIGURE 3, each exit portion 23 has a recess 28 extending circumferentially around its upper internal surface. The lower end of the respective nozzle member 22 is received in the recess 28 to form a substantially gas-tight fit with the exit portion 23. The exit portion 23 is secured to the nozzle member 22 by means of a screw thread connection, the external surface of the exit portion 23 at the upstream end being provided with a circumferential screw thread which engages an internally threaded annular nut 25. The annular nut 25 has an inwardly extending flange 26 at its upper end which engages an external circumferential lip 27 on the lower end of the nozzle member 22 to render the nut 25 captive on the nozzle member 22. It will be appreciated that any other convenient method may be employed to secure the respective exit portions 23 detachably to the respective nozzle member 22.

Each nozzle assembly 20 is rotatably mounted at the downstream end of the respective engine 11 by means of a rotatable gas-tight annular seal, indicated diagrammatically at 30. The nozzle assembly 20 is rotatable about the longitudinal axis 13 of the engine by means of an actuator motor, indicated diagrammatically at 31. The actuator motors 31 of the respective nozzle assemblies 20 are operated in unison so that the discharge outlets 24 of each of the nozzle assemblies 30 and, therefore, the jet discharges therefrom, are at all times parallel to each other.

It will be appreciated that, as the nozzle assemblies 20 are rotated, the direction of jet efflux from each respective engine 11 will move around a conical surface the axis of which coincides with the engine's axis 13, so that the jet efflux direction will change relative to the yaw axis of the aircraft (that is, the vertical direction, as shown in FIGURE 1). Moreover, by virtue of the permanent tilt (β) of each engine 11 is mounted in the pod 12 (FIGURE 2) and the tilt (α) of the pod 12 on the aircraft (FIGURE 1), it can be arranged that the resultant direction of jet efflux from the nozzle assembly 20 varies, on rotation of the nozzle assembly 20, from a substantially vertical direction in which the engines 11 produce the maximum direct lift, to a rearward direction in which the engines 11 assist in forward propulsion of the aircraft 10, with an intermediate position in which the jet efflux makes a large angle with the horizontal, so as to permit ground running with the engines 11 exhausting substantially sideways away from the fuselage and thus with the minimum of ground erosion. Such an arrangement for mounting lift engines in an aircraft with "compound tilt" has been described in the applicant's U.S. patent application Ser. No. 488,209, filed Sept. 17, 1965.

By providing nozzle assemblies of multi-tubular form, with relatively short axial length, the overall longitudinal dimensions of each engine 11 are substantially reduced. As a result, the frontal area presented by each pod 12 is reduced, leading to a reduction in the overall drag on the aircraft 10. A closer spacing of the engines 11 in each pod 12 is, moreover, permitted without the jet exhaust of one engine 11 interfering with the adjacent engines. It is estimated that the overall saving in the frontal area of the pod achieved by providing the engines 11 with the nozzle assemblies according to the invention is of the order of 9%.

I claim:

1. A nozzle assembly having an axis of symmetry, a plurality of tubular nozzle members extending parallel to and symmetrically disposed about said axis, each nozzle member having an upstream and a downstream end, a common annular chamber communicating with the upstream end of each nozzle member, and a plurality of curved exit portions each of which has a respective upstream end which is detachably secured to the downstream end of a respective nozzle member and a downstream end which terminates in a respective discharge outlet disposed in a plane inclined to the said axis of symmetry, so that gases passing through the nozzle assembly are discharged through said exit portions in a common direction inclined to said axis.

2. A nozzle assembly as claimed in claim 1 in which a junction is provided between each nozzle member and its respective exit portion, said junction being disposed in a plane perpendicular to said axis of symmetry.

3. A nozzle assembly as claimed in claim 1 in which each exit portion has an external screw thread at its upstream end by means of which it is attached to the respective nozzle member.

4. A gas turbine jet engine having turbine means and, immediately downstream of said turbine means, a jet nozzle assembly having an axis of symmetry coinciding with the longitudinal axis of the engine, a plurality of tubular nozzle members extending parallel to and symmetrically disposed about said axis, each nozzle member having an upstream and a downstream end, a common annular chamber communicating with the upstream end of each nozzle member, and disposed downstream of said turbine means to receive exhaust gases therefrom, and respective curved exit portions each of which has a respective upstream end which is detachably secured to the downstream end of a respective nozzle member and a downstream end which terminates in a discharge outlet disposed in a plane inclined to the said axis, so that said exhaust gases are discharged from said outlets in a common direction inclined to said common axis.

5. An engine as claimed in claim 4 in which the nozzle assembly is mounted on the engine for rotation about the said axis of symmetry.

6. An engine as claimed in claim 4 installed in an aircraft for the purpose of generating direct lift forces on the aircraft independently of aerodynamic lift.

7. An aircrat power plant assembly comprising a housing and a plurality of gas turbine jet engines according to claim 4 disposed side by side with their longitudinal axes parallel within the housing.

8. A power plant assembly according to claim 7 mounted in an aircraft, the axis of each engine being disposed in a plane of symmetry of the housing, said plane being inclined to the pitching plane of the aircraft.

9. A power plant assembly according to claim 7 in which each engine is mounted within the housing with its longitudinal axis inclined to the longitudinal axis of the housing, each engine having an air intake which is disposed forwardly of ts respective nozzle assembly.

References Cited

UNITED STATES PATENTS

| 3,147,591 | 9/1964 | McEwen | 60—232 |
| 3,281,082 | 10/1966 | Kerry | 244—52 |
| 3,330,502 | 7/1967 | Colville | 244—52 |
| 3,392,529 | 7/1968 | Pike | 60—232 |

CARLTON R. CROYLE, *Primary Examiner.*

DOUGLAS HART, *Assistant Examiner.*

U.S. Cl. X.R.

244—52; 239—265.27, 265.35